(12) United States Patent
Dale et al.

(10) Patent No.: US 11,715,115 B2
(45) Date of Patent: *Aug. 1, 2023

(54) SYSTEM AND METHOD FOR MANAGING COMPLIANCE WITH RETAIL DISPLAY REGULATIONS ACROSS A PLURALITY OF JURISDICTIONS

(71) Applicant: Information Planning and Management Service Inc., Sterling, VA (US)

(72) Inventors: Ernest James Dale, Waterford, VA (US); Barbara Clark Eichenser, Leesburg, VA (US)

(73) Assignee: Information Planning & Management Service Inc., Sterling, VA (US)

( * ) Notice: Subject to any disclaimer, the term of this patent is extended or adjusted under 35 U.S.C. 154(b) by 301 days.

This patent is subject to a terminal disclaimer.

(21) Appl. No.: 16/914,909

(22) Filed: Jun. 29, 2020

(65) Prior Publication Data

US 2021/0004839 A1    Jan. 7, 2021

Related U.S. Application Data

(63) Continuation of application No. 15/159,091, filed on May 19, 2016, now Pat. No. 10,699,279, which is a
(Continued)

(51) Int. Cl.
*G06Q 10/10* (2023.01)
*G06Q 30/02* (2023.01)
(Continued)

(52) U.S. Cl.
CPC ......... *G06Q 30/018* (2013.01); *G06Q 30/02* (2013.01); *G06Q 10/087* (2013.01); *G06Q 10/103* (2013.01)

(58) Field of Classification Search
CPC .... G06Q 30/018; G06Q 30/02; G06Q 10/087; G06Q 10/103
(Continued)

(56) References Cited

U.S. PATENT DOCUMENTS 3,086,308 A    4/1963  Ternouth
3,845,715 A    11/1974 Hochstrasser
(Continued)

FOREIGN PATENT DOCUMENTS

EP    0299355 A2    1/1989
GB    2386708    9/2003
(Continued)

OTHER PUBLICATIONS

"Study Quantifies Electronic Label Benefits", Chain Store Age Executive, vol. 66, No. 9, Sep. 1990, p. 70.
(Continued)

*Primary Examiner* — Jonathan P Ouellette

(57) ABSTRACT

Compliance with retail display regulations that retailers are subject to within a plurality of jurisdictions is managed. Retail display regulations may differ from jurisdiction to jurisdiction. To facilitate compliance, retail display regulations for a plurality of jurisdictions are centrally maintained. The regulations may then be used to dynamically generate retail display materials for locations across a plurality of jurisdictions with different regulatory schemes. The central storage and/or maintenance of the retail display regulations may facilitate compliance with disparate regulatory schemes that retailers are subject to based in part of retail location. Central storage of the retail display regulations may facilitate certification of compliance by regulating entities associated with the jurisdictions.

22 Claims, 3 Drawing Sheets

Related U.S. Application Data continuation of application No. 12/561,985, filed on Sep. 17, 2009, now Pat. No. 9,367,851.

(51) Int. Cl.
*G06Q 30/06* (2023.01)
*G06Q 30/018* (2023.01)
*G06Q 10/087* (2023.01)

(58) Field of Classification Search
USPC .................................. 705/1.1, 317, 346
See application file for complete search history.

(56) References Cited

U.S. PATENT DOCUMENTS

| | | |
|---|---|---|
| 3,858,717 A | 1/1975 | Peters |
| 3,886,683 A | 6/1975 | Hudgin |
| 3,889,408 A | 6/1975 | Offner |
| 4,002,886 A | 1/1977 | Sundelin |
| 4,028,537 A | 6/1977 | Snow |
| 4,034,983 A | 7/1977 | Dash |
| 4,112,650 A | 9/1978 | Tucker |
| 4,139,121 A | 2/1979 | Roccaforte |
| 4,139,149 A | 2/1979 | Crepeau |
| 4,154,027 A | 5/1979 | Searcy |
| 4,180,204 A | 12/1979 | Girard |
| 4,208,818 A | 6/1980 | Butcher |
| 4,237,537 A | 12/1980 | Pitches |
| 4,260,055 A | 4/1981 | Slaybaugh |
| 4,262,436 A | 4/1981 | Clement |
| 4,296,563 A | 10/1981 | Clement |
| 4,306,366 A | 12/1981 | Taub |
| 4,322,611 A | 3/1982 | Edelman |
| 4,346,453 A | 8/1982 | Drapeau |
| 4,378,884 A | 4/1983 | Anderson |
| 4,397,606 A | 8/1983 | Bruton |
| 4,419,573 A | 12/1983 | Von Geldern |
| 4,423,319 A | 12/1983 | Jacobsen |
| 4,438,432 A | 3/1984 | Hurcum |
| 4,500,880 A | 2/1985 | Gomersall |
| 4,515,490 A | 5/1985 | Marker, III |
| 4,519,631 A | 5/1985 | Stone |
| 4,521,677 A | 6/1985 | Sarwin |
| 4,525,713 A | 6/1985 | Barletta |
| 4,529,871 A | 7/1985 | Davidson |
| 4,531,311 A | 7/1985 | Howard |
| 4,531,313 A | 7/1985 | Fast |
| 4,547,844 A | 10/1985 | Adams |
| 4,549,750 A | 10/1985 | Stone |
| 4,565,290 A | 1/1986 | Corrigan |
| 4,603,495 A | 8/1986 | Stevens |
| 4,607,753 A | 8/1986 | Radek |
| 4,638,313 A | 1/1987 | Sherwood, Jr. |
| 4,654,514 A | 3/1987 | Watson |
| 4,656,463 A | 4/1987 | Anders |
| 4,667,193 A | 5/1987 | Cotie |
| 4,677,777 A | 7/1987 | Hoffman |
| 4,680,583 A | 7/1987 | Grover |
| 4,682,825 A | 7/1987 | Crosslen |
| 4,688,154 A | 8/1987 | Nilssen |
| 4,702,558 A | 10/1987 | Coles |
| 4,703,575 A | 11/1987 | Diamond |
| 4,713,899 A | 12/1987 | Fast |
| 4,745,404 A | 5/1988 | Kallenberg |
| 4,752,003 A | 6/1988 | Miller |
| 4,755,010 A | 7/1988 | Wilson |
| 4,766,295 A | 8/1988 | Davis |
| 4,780,599 A | 10/1988 | Baus |
| 4,783,740 A | 11/1988 | Ishizawa |
| 4,791,281 A | 12/1988 | Johnsen |
| 4,791,424 A | 12/1988 | Pore |
| 4,807,833 A | 2/1989 | Pori |
| D300,836 S | 4/1989 | Goldstein |
| 4,821,291 A | 4/1989 | Stevens |
| 4,827,395 A | 5/1989 | Anders |
| 4,828,121 A | 5/1989 | Willcocks, Jr. |
| 4,839,977 A | 6/1989 | Krautsack |
| 4,875,158 A | 10/1989 | Ashkin |
| 4,878,771 A | 11/1989 | Nishida |
| 4,879,756 A | 11/1989 | Stevens |
| 4,882,724 A | 11/1989 | Vela |
| 4,884,702 A | 12/1989 | Rekow |
| 4,888,709 A | 12/1989 | Revesz |
| 4,896,151 A | 1/1990 | Kuranami |
| 4,937,586 A | 6/1990 | Stevens |
| 4,947,322 A | 8/1990 | Tenma |
| 4,959,530 A | 9/1990 | O'Connor |
| 4,962,466 A | 10/1990 | Revesz |
| 4,982,852 A | 1/1991 | Johansen |
| 5,006,002 A | 4/1991 | Brodbeck |
| 5,019,811 A | 5/1991 | Olsson |
| 5,038,023 A | 8/1991 | Saliga |
| 5,042,768 A | 8/1991 | Goldstein |
| 5,044,104 A | 9/1991 | Hopperdietzel |
| 5,053,883 A | 10/1991 | Johnson |
| 5,096,355 A | 3/1992 | Schroeder |
| 5,097,981 A | 3/1992 | Degasperi |
| 5,100,178 A | 3/1992 | MacKelvie |
| 5,103,970 A | 4/1992 | Nielson |
| 5,111,196 A | 5/1992 | Hunt |
| 5,111,943 A | 5/1992 | Ramey |
| 5,128,664 A | 7/1992 | Bishop |
| 5,130,983 A | 7/1992 | Heffner, III |
| 5,132,680 A | 7/1992 | Tezuka |
| 5,158,310 A | 10/1992 | Tannehill |
| 5,160,920 A | 11/1992 | Harris |
| 5,165,316 A | 11/1992 | Hayes |
| 5,172,109 A | 12/1992 | Saini et al. |
| 5,172,314 A | 12/1992 | Poland |
| 5,176,224 A | 1/1993 | Spector |
| 5,193,681 A | 3/1993 | Lievsay |
| 5,194,846 A | 3/1993 | Lee |
| 5,197,215 A | 3/1993 | Torsleff |
| 5,197,609 A | 3/1993 | Siegel |
| 5,198,644 A | 3/1993 | Pfeiffer |
| 5,206,461 A | 4/1993 | Genzel |
| 5,207,050 A | 5/1993 | Fulkerson |
| 5,215,542 A | 6/1993 | Pore |
| 5,220,739 A | 6/1993 | Chich |
| 5,237,767 A | 8/1993 | Kringel |
| 5,240,125 A | 8/1993 | Kunz |
| 5,241,467 A | 8/1993 | Failing |
| 5,243,504 A | 9/1993 | Sejzer |
| 5,245,477 A | 9/1993 | Nyman |
| 5,245,534 A | 9/1993 | Waterhouse |
| 5,263,269 A | 11/1993 | Tjaernlund |
| 5,264,822 A | 11/1993 | Vogelman |
| 5,287,266 A | 2/1994 | Malec |
| 5,289,652 A | 3/1994 | Kringel |
| 5,291,990 A | 3/1994 | Sejzer |
| 5,295,064 A | 3/1994 | Malec |
| 5,299,116 A | 3/1994 | Owens |
| 5,299,117 A | 3/1994 | Farnbach |
| 5,313,392 A | 5/1994 | Temma |
| 5,313,569 A | 5/1994 | Olsson |
| 5,315,093 A | 5/1994 | Stewart |
| 5,315,775 A | 5/1994 | Parker |
| D348,287 S | 6/1994 | Odmark |
| 5,343,648 A | 9/1994 | Bracken |
| 5,344,250 A | 9/1994 | Kringel |
| 5,348,485 A | 9/1994 | Briechle |
| 5,351,186 A | 9/1994 | Bullock |
| 5,363,578 A | 11/1994 | Chesley |
| 5,364,177 A | 11/1994 | Ugalde |
| 5,368,129 A | 11/1994 | Von Kohorn |
| 5,374,815 A | 12/1994 | Waterhouse |
| 5,382,779 A | 1/1995 | Gupta |
| 5,383,111 A | 1/1995 | Homma |
| 5,388,158 A | 2/1995 | Berson |
| 5,388,955 A | 2/1995 | Schroeder |
| 5,389,985 A | 2/1995 | Olson |
| 5,393,965 A | 2/1995 | Bravman |
| 5,401,947 A | 3/1995 | Poland |
| 5,415,918 A | 5/1995 | Lang |

(56) References Cited

U.S. PATENT DOCUMENTS

| | | |
|---|---|---|
| 5,418,354 A | 5/1995 | Halling |
| 5,420,606 A | 5/1995 | Begum |
| 5,421,583 A | 6/1995 | Gluck |
| 5,423,425 A | 6/1995 | Stompe |
| 5,423,617 A | 6/1995 | Marsh |
| 5,427,236 A | 6/1995 | Kramer |
| 5,442,343 A | 8/1995 | Cato |
| 5,448,226 A | 9/1995 | Failing, Jr. |
| 5,461,561 A | 10/1995 | Ackerman |
| 5,461,809 A | 10/1995 | Fowler |
| 5,462,158 A | 10/1995 | Kramer |
| 5,465,085 A | 11/1995 | Caldwell |
| 5,467,474 A | 11/1995 | Ackerman |
| 5,472,289 A | 12/1995 | Kringel |
| 5,473,146 A | 12/1995 | Goodwin, III |
| 5,473,832 A | 12/1995 | Briechle |
| 5,493,107 A | 2/1996 | Gupta |
| 5,502,911 A | 4/1996 | Watts |
| 5,510,602 A | 4/1996 | Evans |
| 5,532,465 A | 7/1996 | Waterhouse |
| 5,537,126 A | 7/1996 | Kayser |
| 5,537,312 A | 7/1996 | Sekiguchi |
| D373,146 S | 8/1996 | Odmark |
| 5,548,282 A | 8/1996 | Escritt |
| 5,553,412 A | 9/1996 | Briechle |
| 5,558,235 A | 9/1996 | Hunt |
| 5,575,100 A | 11/1996 | Marvin |
| 5,583,487 A | 12/1996 | Ackerman |
| 5,632,010 A | 5/1997 | Briechle |
| 5,651,852 A | 7/1997 | Mitchell |
| 6,473,984 B1 | 11/2002 | Splain |
| 6,749,116 B2 | 6/2004 | Massaro |
| 7,191,951 B2 | 3/2007 | Hanyu |
| 7,287,001 B1 | 10/2007 | Falls |
| 7,308,423 B1 | 12/2007 | Woodward |
| 7,440,903 B2 | 10/2008 | Riley |
| 7,698,259 B2 | 4/2010 | Xue |
| 7,957,998 B2 | 6/2011 | Riley |
| 8,020,765 B2 | 9/2011 | Nunez |
| 2002/0167500 A1 | 11/2002 | Gelbman |
| 2003/0200129 A1 | 10/2003 | Klaubauf |
| 2004/0135364 A1 | 7/2004 | Dale |
| 2005/0134461 A1 | 6/2005 | Gelbman |
| 2005/0256726 A1* | 11/2005 | Benson .............. G06Q 10/0637 705/28 |
| 2007/0145142 A1 | 6/2007 | Lubow |
| 2008/0255894 A1 | 10/2008 | Falls |
| 2008/0306787 A1 | 12/2008 | Hamilton |
| 2009/0059270 A1 | 3/2009 | Opalach |
| 2011/0066458 A1 | 3/2011 | Dale |
| 2014/0129395 A1 | 5/2014 | Groenovelt |

FOREIGN PATENT DOCUMENTS

| | | |
|---|---|---|
| WO | 9014630 | 11/1990 |
| WO | 9205415 | 4/1992 |
| WO | 9305456 | 3/1993 |
| WO | 9305475 | 3/1993 |
| WO | 9705556 | 2/1997 |

OTHER PUBLICATIONS

Carter, O.B.J., et al., "The Effect of Retail Cigarette Pack Displays on Unplanned Purchases: Results from Immediate Postpurchase Interviews", Research Paper, Mar. 4, 2009, 4 pages.

Esler, Bill, "Commercial Shops Eye Packaging", Graphic Arts Monthly, vol. 67, No. 10, Oct. 1995, p. 75 (4 pages).

Garry, Michael, "Will Supermarkets Play Electronic Tag?", Progressive Grocer, Jul. 1991, pp. 99-104.

Information Planning & Management Services, Inc. (hereinafter, IPMS), 30 pages.

NPL_Shelf_Builder, Compilation of Announcement, downloaded from http://connection.ebscohost.com/content/article/1031301849. html?view=print and Shelf Builder, downloaded from http://web.archive.org/web/20000815225534/acnielsen.com/products/tools/shelfbuilder/, downloaded May 10, 2009, total pages=3.

NPL_Spaceman, Compilation of Announcement, downloaded on May 9, 2009, 2 pages from http://www.thefreelibrary.com/_/print/PrintArticle.aspx?id=54262974 and Spaceman Professional Brochure, 6 pages, downloaded from http://web.archive.org/web/20030630111507/acnielsen.com/download/pdf/brochure/spacemanpro.pdf.

Reiter, Jeff, "Smart Packaging", Dairy Foods, vol. 91, No. 3, Mar. 1990, p. 54 (6 pages).

Shelf Builder Brochure, downloaded from http://web.archive.org/web/20000817230738/acnielsen.com/download/pdf/brochure/shelfbuilder.pdf, on May 10, 2009, total pages=1.

Shelf Builder, Merchandising Services, p. 1. Downloaded from http://web.archive.org/web/20030325112935/www.nielsen.com/download/pdf/brochure/ shelbuilder.pdf on Jun. 19, 2008.

Spaceman Professional v3.0, 24 pages, downloaded on May 9, 2009 from http://web.archive.org/web/20060321132733/www.acnielsen.com/download/pdf/guides/spacemanpro.pdf.

Spaceman Professional v3.0, Quick Reference Guide, pp. 1-24. Downloaded from http://web.archive.org/web/20030212182913/acnielsen.com/products/tools/spaceman.pdf and selecting the Select Quick Start Guide on Jun. 19, 2008.

Spaceman Store Suite, 1 page downloaded from http://web.archive.org/web/20000818193729/www.acnielsen.com/download/pdf/sales/spacemanstoresuite.pdf and Spaceman Professional FAQ downloaded from http://web.archive.org/web/20020912185520/acnielsen.com/products/tools/spaceman/pro/faq.htm, 4 pages.

Spaceman Store Suite, Merchandising Services, p. 1. Downloaded from http://web.archive.org/web/20000818193729/www.acnielsen.com/download/pdf/ sales/spacemanstoresuite.pdf on Jun. 19, 2008.

Spaceman_Pro_FAQ, pp. 1-3. Downloaded from http://web.archive.org/web/20030220191442/www.acnielsen.com/products/tool/spaceman/ pro/faq.htm on Jun. 19, 2008.

Tobacco Retailers: "Tobacco Reforms", Information for Tobacco Retailers, Victorian Government Health Information, Australia, Jul. 28, 2008, 8 pages.

\* cited by examiner

SYSTEM AND METHOD FOR MANAGING COMPLIANCE WITH RETAIL DISPLAY REGULATIONS ACROSS A PLURALITY OF JURISDICTIONS

CROSS-REFERENCE TO RELATED APPLICATIONS

This application is a continuation of U.S. patent application Ser. No. 15/159,091, filed May 19, 2016, entitled "SYSTEM AND METHOD FOR MANAGING COMPLIANCE WITH RETAIL DISPLAY REGULATIONS ACROSS A PLURALITY OF JURISDICTIONS", which is a continuation of U.S. patent application Ser. No. 12/561,985, filed Sep. 17, 2009, entitled "SYSTEM AND METHOD FOR MANAGING COMPLIANCE WITH RETAIL DISPLAY REGULATIONS ACROSS A PLURALITY OF JURISDICTIONS" (which issued as U.S. Pat. No. 9,367,851 on Jun. 14, 2016), which are hereby incorporated herein by reference in their entirety.

FIELD OF THE INVENTION

The invention relates to implementing centralized storage of retail display regulations for a plurality of different jurisdictions to enhance compliance of retailers with stores in a plurality of different jurisdictions to the appropriate retail display regulations.

BACKGROUND OF THE INVENTION

Retail display materials provide information to consumers at the point of display. Such materials may include, for example, price labels applied to a shelf, pegboard, or other display apparatus, price labels applied directly to products, signage (e.g., conveying price and/or "on sale" status), and/or other retail display materials. The information provided via retail display materials may include, for example, product identification, price, unit price, and/or other information. Retail display materials are regulated in North America, and throughout the world. However, regulation of retail display materials can vary from jurisdiction to jurisdiction. As such, retailers having stores or other retail locations in more than one jurisdiction may not be able to print retail display materials in a single format. Instead, a plurality of different formats may be required to satisfy the various local regulatory schemes. Changes to individual regulatory schemes, and certification requirements in a plurality of different jurisdictions may present additional costs and/or concerns for retailers with locations in a plurality of different jurisdictions.

SUMMARY

One aspect of the invention relates to management of compliance with retail display regulations that retailers are subject to within a plurality of jurisdictions. Retail display regulations may differ from jurisdiction to jurisdiction. To facilitate compliance, retail display regulations for a plurality of jurisdictions are centrally maintained. The regulations may then be used to dynamically generate retail display materials for locations across a plurality of jurisdictions with different regulatory schemes. The central storage and/or maintenance of the retail display regulations may facilitate compliance with disparate regulatory schemes that retailers are subject to based in part of retail location. Central storage of the retail display regulations may facilitate certification of compliance by regulating entities associated with the jurisdictions.

As used herein, "retail display materials" may refer to price labels applied to a shelf, pegboard, or other display apparatus, price labels applied directly to products, and/or signage (e.g., conveying price and/or "on sale" status). This is not intended to be limiting, as "retail display materials" may include one or more other materials and/or media used to convey information to consumers about products (e.g., price, unit price, regular price, reduced or sale price, product details, a product identifier such as a UPC/GTIN/SKU identifier, and/or other information at the point of display). As used herein, the term "retail display regulation" may refer to a price label regulation regulating one or more parameters of price labels, a signage regulation regulating one or more parameters of retail display signage, and/or a sale regulation regulating one or more parameters of an "on sale" status of a product and/or the display thereof. This is not intended to be limiting, and a retail display regulation may refer to one or more other types of regulations that regulate one or more parameters of retail display materials. As used herein, the term "regulations" refers not only to affirmative requirements and/or restrictions, but allowances and exceptions to requirements and/or restrictions.

In one embodiment, a system configured to manage compliance with retail display regulations comprises electronic storage and one or more processors. The electronic storage comprises electronic storage media that electronically stores information. The information stored to the electronic storage may include one or more of retail display regulations, jurisdiction information, product information, retailer information, store information, location information, certification information, and/or other information related to the retail display regulations and/or compliance therewith.

The retail display regulations may regulate one or more parameters of retail display materials. By way of non-limiting example, a retail display parameter may include one or more of a shelf level requirement, a retail display material background color restriction, a retail display material space allowance, a product description requirement (e.g., font, size, point size, color, and/or other requirements), a retail price listing requirement (e.g., text type, font, size, point size, color, and/or other requirements), a unit price listing requirement (e.g., text type, font, uniformity, rounding and/or calculations, ratio to price, and/or other regulations), a unit of measurement requirement (font, size, weights and measure types, and/or other requirements), a UPC/GTIN/SKU requirement (e.g., placement, font, point size, and/or other requirements), a sale and/or reduced price requirement (e.g., start and end dates, font, format, size, and/or other requirements), and/or other parameters.

Retail Display regulations may vary from jurisdiction to jurisdiction. As such, at one location, retail display materials may be governed by a first set of retail display regulations, while at a second locations retail display materials may be governed by a second set of retail display regulations. The jurisdictions may be associated with one or more of a town or city, a county, a state or province, a country, and/or other jurisdictions.

In some instances, the jurisdictions may be layered. For example, at a given location at least one retail display regulation enforced at the given location may be enforced by a regulating entity associated with a country (e.g., the U.S., Mexico, Canada, etc.) in which the given location resides, at least one retail display regulation may be enforced by a regulating entity associated with state or province within which the given location resides, and/or at least one retail display regulation may be enforced by a regulating entity associated with a county or city within which the given location resides.

The retail display regulations stored within electronic storage may be organized according to jurisdiction. This may include indexing or relating retail display regulations to jurisdictions and/or indexing or relating jurisdictions to retail display regulations.

To facilitate access of the relevant retail display regulations for a given location, the jurisdictions may be organized within the electronic storage according to location. This may include indexing or relating the jurisdictions to one or more reference systems for location (e.g., postal code, mailing address, longitude/latitude, and/or other reference systems for location), and/or indexing or relating one or more reference systems for location against the jurisdictions.

One or more of the retail display regulations may be specific to a product, a product-type, and/or a product category. By way of non-limiting example, one or more of the retail display regulations may be specific to the product categories specified by the National Conference on Weights and Measures. In order to facilitate accessing retail display regulations for a given product, product-type, and/or product category, the retail display regulations stored within the electronic storage may be indexed or related to products (and/or product-types, and/or product-classes), and/or products (and/or product-types, and/or product-classes) may be indexed or related to retail display regulations.

As will be discussed further below, one or more retailers may provide location information to the system to facilitate the automated generation of retail display materials, such as price labels, signage, and/or other retail display materials that comply with local retail display regulations. To facilitate accessing retail display regulations for a given retailer, one or more locations (e.g., store location(s) for the given retailer may be stored within the electronic storage.

Various jurisdictions may require retailers displaying retail display materials therein to obtain certification of the retail display materials that they are displaying (and/or formats of the retail display materials). These certifications may require renewal, and/or re-inspection at regular intervals. In some implementations, the electronic storage may store information related to certification of retail display materials and/or formats for retail display materials by the jurisdictions. This information may include, for example, indications as to whether individual jurisdictions require certification, a certification renewal interval, an index or relation to one or more specific retail display regulations for which certification is required, the certification status of a given retailer (or retail store associated with the given retailer) with respect to a jurisdiction and/or retail display regulation, and/or other information related to certification.

In some embodiments, the one or more processors may be configured to execute one or more computer program modules. The one or more computer program modules may include one or more of an information maintenance module, a regulation request reception module, a regulation request processing module, a retail display material request module, a retail display material definition module, a retail display material generation module, a certification module, a reminder module, and/or other modules.

The information maintenance module may be configured to maintain and/or organize the information stored to the electronic storage. This may include organizing the information within the electronic storage in the manner described herein. In order to maintain and/or organize information the electronic storage, the information maintenance module may provide an interface through which retail display regulations, jurisdiction information, certification information, location information, store information, product information, retailer information, and/or other information stored to the electronic storage can be added, amended, indexed and/or related, and/or otherwise organized or maintained. This interface may enable one or more users to access the information within the electronic storage directly to manually organize and/or maintain the information. The interface may enable information to be received electronically to the system (e.g., in a transmission of an electronic file including relevant information), and the information maintenance module may automatically update, enter, remove, index or relate, and/or otherwise organize or maintain the information within the electronic storage based on the electronically received information.

The interface to the electronic storage provided by the information maintenance module may for example, enable a system administrator to manually organize and/or maintain the information. As another example, one or more users associated with one or more of regulating entities of one or more jurisdictions may access the information within the electronic storage via the information maintenance module to enter regulations, amend regulations, interact with certification information (for individual retailers, for retail display regulations stored within the electronic storage, for retail display materials generated by the system, and/or other types of certifications), and/or otherwise organize and/or maintain information stored in the electronic storage. As yet another example, the interface provided by the information maintenance module may enable one or more users associated with a retailer to organize and/or maintain information stored within the electronic storage. For instance, the user may update, enter, remove, and/or otherwise interact with information related to stores, information related to locations at which stores are located, information related to products, and/or other information related to the retailer.

The regulation request reception module may be configured to receive regulation requests. The regulation requests may request retail display regulations stored within the electronic storage. A given regulation request may specify which retail display regulations are requested directly, or the given regulation request may specify which retail display regulations are requested indirectly by indicating display circumstances associated with a specific set of one or more retail display regulations. By way of example, the given regulation request may indicate a jurisdiction, a location, a store, a retailer, a product, a promotion (e.g., a "sale" or "price reduction"), a retail display materials type (e.g., a price label, a sign, and/or other retail display materials types), and/or other circumstances associated with a specific set of retail display regulations. As a more specific (but non-limiting) example, the given regulation request may indicate a requesting a retailer, a relevant store location, and a relevant product.

The regulation request reception module may be configured to receive regulation requests that are communicated to the one or more processors electronically (e.g., over a communications network such as the Internet or other networks). In some instances, regulation requests may be received by the regulation request reception module from other ones of the computer modules.

The regulation request processing module may be configured to process received regulation requests. Processing received regulation requests may include identifying the retail display regulations requested in a given regulation request, and obtaining the identified retail display regulations. The retail display regulations may be identified based on display circumstances indicated in the given regulation request. The requested retail display regulations may be obtained from the electronic storage. Upon obtaining the requested retail display regulations, the regulation request processing module may provide access to the obtained retail display regulations to the requesting entity. If the requesting entity is a regulating entity associated with one or more jurisdictions, providing access to the obtained retail display regulations may include electronically transmitting the obtained retail display regulations to a computing platform associated with the requesting entity. If the requesting entity is one of the computer program modules executed on the one or more processors, providing access to the obtained retail display regulations may include enabling the requesting module to access the obtained retail display regulations within the electronic storage, or providing the obtained retail display regulations to the requesting module.

As mentioned above, in some implementations, a retailer and/or regulating entity may request access to retail display regulations by issuing a regulation request to the regulation request reception module. In response to such a regulation request, the regulation request processing module may provide access to the requested retail display regulations in a "raw" form that simply enumerates that requested retail display regulations. However, the regulation request processing module may alternatively, or additionally, provide access to the requested retail display regulations in the form of mock and/or generic retail display materials (or files defining the retail display materials) that conform to the requested regulations. The mock and/or generic retail display materials may be implemented by the retailer and/or the regulating entity in certification of compliance with retail display regulations. The mock and/or generic retail display materials (or files defining the retail display materials) may include retail display materials that have previously been generated and stored within the electronic storage as representative of the requested retail display regulations. The mock and/or generic retail display materials (or files defining the retail display materials) may be generated dynamically by the regulation request processing module in response to the retail display materials request from the retailer and/or the regulating entity.

The retail display materials request module may be configured to receive retail display materials requests. The retail display materials requests request generation of one or more retail display materials files that define retail display materials to be displayed in a retail environment. The retail display materials requests may specify one or more display circumstances (e.g., a retailer, one or more stores, one or more locations, one or more products, one or more promotions, a price, a retail display materials type, and/or other display circumstances) in which the requested retail display materials will be displayed. For example, one or more display circumstances may be specified by one or more planogram files included in the retail display materials request. The retail display materials request module may receive retail display materials requests from one or more of retailers, one or more of regulating entities, and/or from other sources.

The retail display materials definition module may be configured to generate, responsive to retail display materials requests received by the retail display materials request module, retail display materials files. The generation of retail display materials files in response to a given retail display materials request may include generating a regulation request to the regulation request reception module for retail display regulations corresponding to the display circumstances indicated in the given retail display materials request. In response to the generated regulation request, the retail display materials definition module may receive access to retail display regulations that correspond to the display circumstances indicated in the retail display materials request (e.g., from the regulation request processing module). Based on the retail display regulations for which access is received, the retail display materials definition module may generate the requested retail display materials files for the display circumstances indicated in the given retail display materials request. These retail display materials files define retail display materials for the display circumstances that conform to the received retail display regulations (where appropriate).

As will be appreciated, in some implementations, each of the individual retail display materials files generated by the retail display materials definition module may not be subject to all of the retail display regulations to which the retail display materials definition module receives access. By way of non-limiting example, a product-specific retail display regulation may be specific to a subset of products indicated in the retail display materials request. In this example the retail display materials files generated by the retail display materials definition module for the subset of products conform to the product-specific retail display regulation, but retail display materials files generated for products not in the subset of products may not conform to the product-specific retail display regulation. As another (also non-limiting) example, a retail display materials request from a retailer may indicate a plurality of stores located in different jurisdictions (e.g., a first jurisdiction and a second jurisdiction). In this example, the retail display materials definition module may receive access to retail display regulations for all of the jurisdictions indicated in the retail display materials request, but the retail display materials files generated for the individual stores may conform only to the retail display regulations for the jurisdiction(s) in which they reside.

The retail display materials generation module is configured to generate retail display materials in response to a receipt of a retail display materials request by the retail display materials request module. The generation of retail display materials may include initiation of production of retail display materials on an output device (e.g., a printing device). The output device may be operatively linked with the retail display materials generation module, or production of the retail display materials on the output device may be initiated by the retail display materials generation module by transmitting instructions for generating the retail display materials to a computing platform in control of the output device (e.g., if the output device is associated with the requesting retailer).

In some implementations, in addition to initiating production of retail display materials on the output device, the retail display materials generation module may provide one or more of the relevant retail display regulations to the regulating entity or the retailer that issued the retail display materials request to the retail display materials request module. The provision of the relevant retail display regulations with the initiation of production of the retail display materials may enable the requesting regulating entity and/or the retailer to ensure that the retail display materials comply with the relevant retail display regulations, that the relevant retail display regulations are correct and/or current, may facilitate certification of compliance with retail display regulations, and/or may otherwise facilitate use of the retail display materials.

The certification module is configured to manage information related to certifications related to retail display regulations. These certification may include certifications by the regulating entities with respect to retail display regulations stored within the electronic storage, retail display materials (and/or retail display materials files defining the same) generated by the system, and/or other blanket certifications that are based on the system as a whole. The certifications may include certifications by the regulating entities that are specific to individual retailers, and/or individual stores associated with individual retailers.

As was described above, the information maintenance module may enable regulating entities to access, review, enter, edit, and/or otherwise interact with retail display regulations stored to the electronic storage. The regulation request processing module may enable regulating entities to access retail display regulations stored to the electronic storage. Based on access to the retail display regulations achieved by the regulating entities via the information maintenance module and/or the retail display regulation request processing module, the regulating entities may certify retail display regulations within the electronic storage and/or retail display materials generated by the system on the basis of the stored retail display regulations.

These certifications may provide the retailers with a degree of confidence in the retail display materials defined and/or generated by the system. In some implementations, the certifications may enable the retailers to forego their own certification with one or more of regulating entities. The certifications may be stored by the electronic storage, and may be provided to retailers and/or regulating entities upon request. For example, the certifications may be provided to retailers along with retail display materials (and/or retail display materials files defining the same) satisfying a retail display materials request.

In some implementations, a given one of the regulating entities may require the retailers to individually certify their retail display materials and/or generic formats for the same. In such implementations, the retailers and/or the given regulating entity may update certifications within the electronic storage based on the results of the individual certifications. These updated certifications may then be used (e.g., by a system administrator) to determine the accuracy of the retail display regulations stored in the electronic storage for the given regulating entity and/or for other purposes.

The reminder module may be configured to issue reminders to the retailers and/or the regulating entities related to retail display materials. These reminders may include, for example, certification reminders, promotional reminders, and/or other reminders.

Certifications by one or more of the regulating entities may expire. For example, a certification for the system generally, or for a retailer individually (or for individual stores associated with the retailer) may expire on a specific day, or after a predetermined time period. The reminder module may be configured to generate reminders of the expiration to one or more of a system administrator, the retailer, and/or the certifying regulating entity. These reminders may prompt the administrator of the system, the retailer, and/or the certifying regulating entity to take action (e.g., re-certification) that will result in the certification not simply expiring.

One or more of the regulating entities may have label regulations that specify one or more time periods associated with promotional labeling and sales. By way of example, a period of time that an item may be indicated as "on sale" or having a "reduced price" may be regulated, a period of time between "sales" or "price reductions" may be regulated, and/or other periods of time may be regulated. To facilitate compliance with such regulations, the reminder module may generate reminders to the retailers that have (or have had) promotions on items appraising them of their compliance with the appropriate regulations. These reminders may be transmitted electronically to a computer platform associated with the retailers (e.g., e-mail, text message, voice mail, electronic calendar invitation, and/or other electronic reminders). The reminder module may determine that a given retailer has a promotion regulated by one or more retail display materials regulations based on retail display materials requests and/or regulation requests made to the system by the given retailer.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
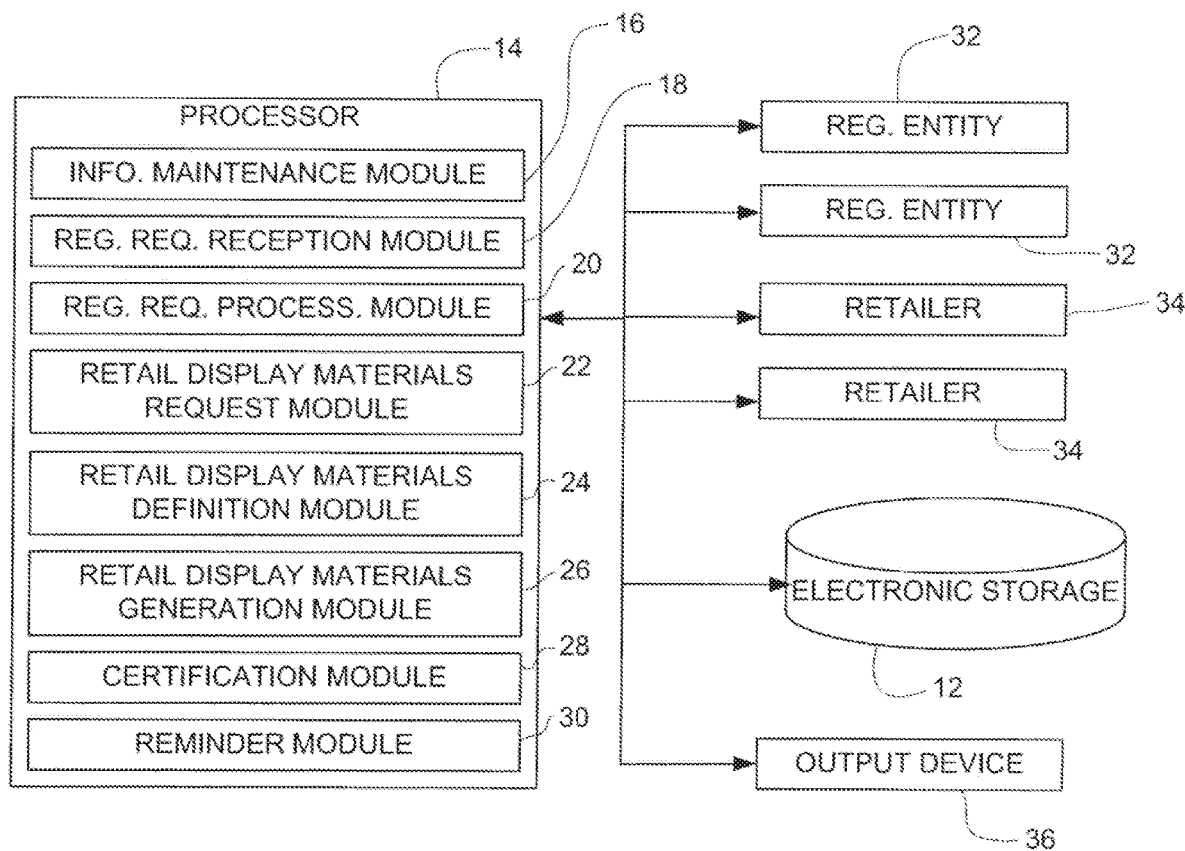
FIG. 1 illustrates a system configured to manage compliance with one or more retail display regulations within a plurality of jurisdictions, according to one or more embodiments of the invention.

FIG. 1 illustrates a system 10 configured to manage compliance with one or more retail display regulations within a plurality of jurisdictions. The system 10 facilitates compliance with local retail display regulations by maintaining electronic storage of current retail display regulations throughout the plurality of jurisdictions. System 10 implements stored regulations to automatically provide access to appropriate retail display regulations in responses to requests for retail display regulations from retailers that specify a product to be labeled, a jurisdiction within which a retail display materials will be displayed, sale information, and/or other information related to retail display materials. In some implementations, system 10 automates the generation of retail display materials that conform to retail display regulations of local jurisdiction(s), thereby reducing required man-hours, increasing compliance with local regulations, and/or providing other enhancements. In some implementations, system 10 is a computer-implemented system comprising electronic storage 12, one or more processors 14, and/or other components.

In some implementations, electronic storage 12 comprises electronic storage media that electronically stores information. The electronically storage media of electronic storage 12 may include one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 12 may store software algorithms, information determined by processor(s) 14, and/or other information that enables system 10 to function properly. Electronic storage 12 may be a separate component within system 10, or electronic storage 12 may be provided integrally in a common device with one or more other components of system 10 (e.g., processor(s) 14).

The information stored to electronic storage 12 may include retail display regulations for retail display materials that are to be displayed in retail environments. The retail display regulations may regulate one or more display parameters of retail display materials. By way of non-limiting example, a display parameter may include one or more of a shelf level requirement, a label background color restriction, a label space allowance, a product description requirement (e.g., font, size, point size, color, and/or other requirements), a retail price listing requirement (e.g., text type, font, size, point size, color, and/or other requirements), a unit price listing requirement (e.g., text type, font, uniformity, rounding and/or calculations, ratio to price, and/or other regulations), a unit of measurement requirement (font, size, weights and measure types, and/or other requirements), a UPC/GTIN/SKU requirement (e.g., placement, font, point size, and/or other requirements), a sale and/or reduced price requirement (e.g., start and end dates, font, format, size, and/or other requirements), a retail display materials type (e.g., a price label, signage, and/or other types), and/or other parameters.

Retail display regulations may vary from jurisdiction to jurisdiction. As such, at one location, retail display materials may be governed by a first set of retail display regulations, while at a second locations retail display materials may be governed by a second set of retail display regulations. The jurisdictions may be associated with one or more of a town or city, a county, a state or province, a country, and/or other jurisdictions.

In some instances, the jurisdictions may be layered. For example, at a given location at least one retail display regulation enforced at the given location may be enforced by a regulating entity associated with a country (e.g., the U.S., Mexico, Canada, etc.) in which the given location resides, at least one retail display regulation may be enforced by a regulating entity associated with state or province within which the given location resides, and/or at least one retail display regulation may be enforced by a regulating entity associated with a county within which the given location resides.

The retail display regulations stored within electronic storage 12 may be organized according to jurisdiction. This may include indexing or relating retail display regulations to jurisdictions and/or indexing or relating jurisdictions to retail display regulations.

To facilitate access of the relevant retail display regulations for a given location, the jurisdictions may be organized within electronic storage 12 according to location. This may include indexing or relating the jurisdictions to one or more reference systems for location (e.g., postal code, mailing address, longitude/latitude, and/or other reference systems for location), and/or indexing or relating one or more reference systems for location against the jurisdictions.

One or more of the retail display regulations may be specific to a product, a product-type, and/or a product category. By way of non-limiting example, one or more of the retail display regulations may be specific to the product categories specified by the National Conference on Weights and Measures. In order to facilitate accessing retail display regulations for a given product, product-type, and/or product category, the retail display regulations stored within electronic storage 12 may be indexed or related to products (and/or product-types, and/or product-classes), and/or products (and/or product-types, and/or product-classes) may be indexed or related to retail display regulations.

As will be discussed further below, one or more retailers may provide location information to system 10 to facilitate the automated generation of retail display materials that comply with local retail display regulations. To facilitate accessing retail display regulations for a given retailer, one or more locations (e.g., store location(s) for the given retailer may be stored within electronic storage 12.

Various jurisdictions may require retailers displaying retail display materials therein to obtain certification for the retail display materials that they are displaying (and/or formats of the retail display materials). These certifications may require renewal, and/or re-inspection at regular intervals. In some implementations, electronic storage 12 may store information related to certification of retail display materials and/or formats for retail display materials by the jurisdictions. This information may include, for example, indications as to whether individual jurisdictions require certification, a certification renewal interval, an index or relation to one or more specific retail display regulations for which certification is required, the certification status of a given retailer (or retail store associated with the given retailer) with respect to a jurisdiction and/or retail display regulation, and/or other information related to certification.

Figure 2:
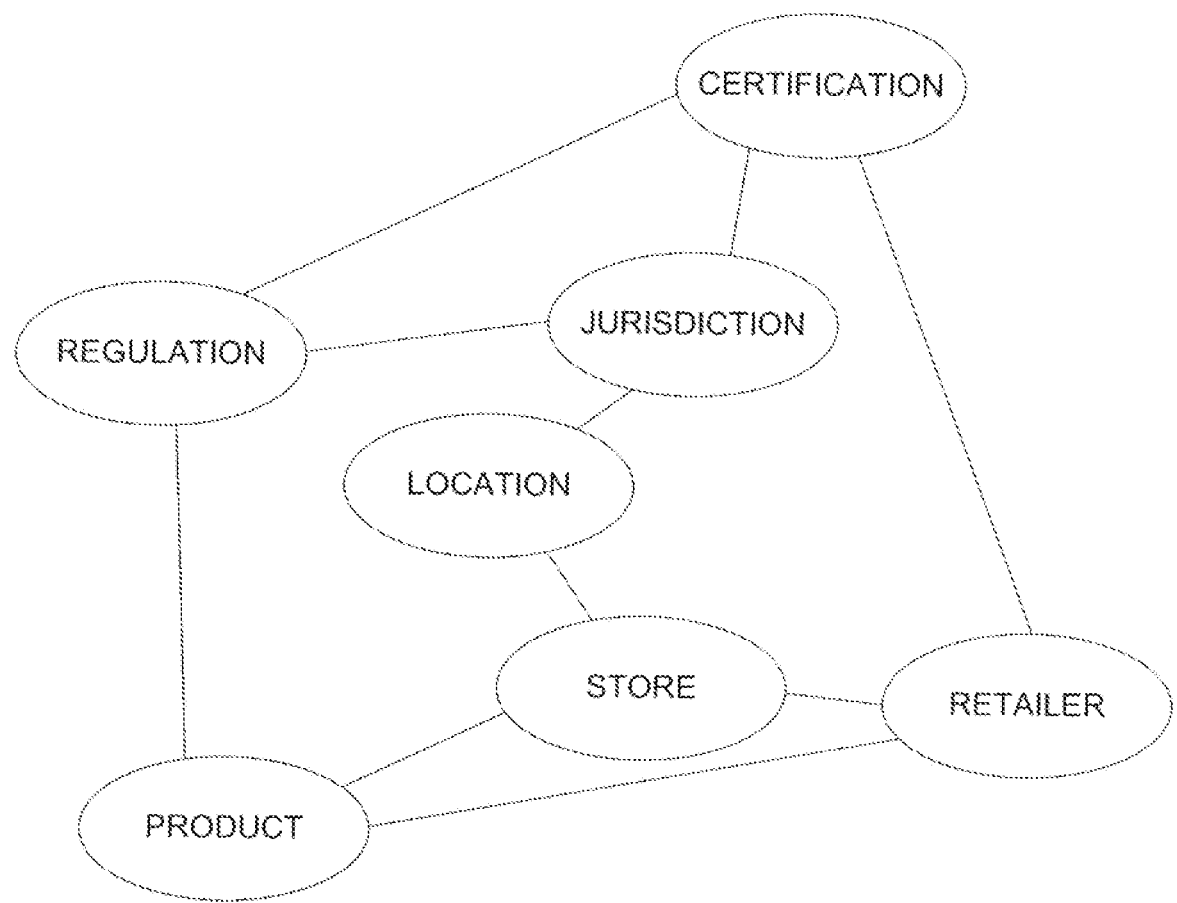
FIG. 2 illustrates an organization of information related to retail display regulations, in accordance with one or more embodiments of the invention.

FIG. 2 provides an exemplary illustration for the organization of at least some of the information that may be stored within electronic storage 12. In the diagram shown in FIG. 2, lines between information types indicate a relation or index between connected information types. It will be appreciated that the illustration of relation between the stored information shown in FIG. 2 is not intended to be limiting, and that other organizations of such information that enable the functionality of system 10 discussed below falls within the scope of this disclosure.

Returning to FIG. 1, processor(s) 14 are configured to provide information processing capabilities in system 10. As such, processor(s) 14 may include one or more of a digital processor, an analog processor, a digital circuit designed to process information, an analog circuit designed to process information, a state machine, and/or other mechanisms for electronically processing information. Although processor(s) 14 are shown in FIG. 1 as a single entity, this is for illustrative purposes only. In some implementations, processor(s) 14 may include a plurality of processing units. As is discussed further below, these processing units may be physically located within the same device, or processor(s) 14 may represent processing functionality of a plurality of devices operating in coordination.

As is shown in FIG. 1, processor(s) 14 may be configured to execute one or more computer program modules. The one or more computer program modules may include one or more of an information maintenance module 16, a regulation request reception module 18, a regulation request processing module 20, a retail display materials request module 22, a retail display materials definition module 24, a retail display materials generation module 26, a certification module 28, a reminder module 30, and/or other modules. The processor(s) 14 may be configured to execute modules 16, 18, 20, 22, 24, 26, 28, and/or 30 by software; hardware; firmware; some combination of software, hardware, and/or firmware; and/or other mechanisms for configuring processing capabilities on processor(s) 14.

It should be appreciated that although modules 16, 18, 20, 22, 24, 26, 28, and 30 are illustrated in FIG. 1 as being co-located within a single processing unit, in implementations in which processor(s) 14 includes multiple processing units, one or more of modules processor(s) 14 may be located remotely from the other modules. The description of the functionality provided by the different modules 16, 18, 20, 22, 24, 26, 28, and/or 30 provided below is for illustrative purposes, and is not intended to be limiting, as any of modules 16, 18, 20, 22, 24, 26, 28, and/or 30 may provide more or less functionality than is described. For example, one or more of modules 16, 18, 20, 22, 24, 26, 28, and/or 30 may be eliminated, and some or all of its functionality may be provided by other ones of modules 16, 18, 20, 22, 24, 26, 28, and/or 30. As another example, processor(s) 14 may be configured to execute one or more additional modules that may perform some or all of the functionality attributed below to one of modules 16, 18, 20, 22, 24, 26, 28, and/or 30.

The information maintenance module 16 may be configured to maintain and/or organize the information stored to electronic storage 12. This may include organizing the information within electronic storage 12 in the manner described above, and/or illustrated in FIG. 2. In order to maintain and/or organize information electronic storage 12, information maintenance module 16 may provide an interface through which retail display regulations, jurisdiction information, certification information, location information, store information, product information, retailer information, and/or other information stored to electronic storage 12 can be added, amended, indexed and/or related, and/or otherwise organized or maintained. This interface may enable one or more users to access the information within electronic storage 12 directly to manually organize and/or maintain the information. The interface may enable information to be received electronically to system 10 (e.g., in a transmission of an electronic file including relevant information), and information maintenance module 16 may automatically update, enter, remove, index or relate, and/or otherwise organize or maintain the information within electronic storage 12 based on the electronically received information.

The interface to electronic storage 12 provided by information maintenance module 16 may for example, enable a system administrator associated with an entity providing system 10 to manually organize and/or maintain the information. As another example, one or more users associated with one or more of regulating entities 32 of one or more jurisdictions may access the information within electronic storage 12 via information maintenance module 16 to enter regulations, amend regulations, interact with certification information (for individual retailers, for retail display regulations stored within electronic storage 12, for retail display materials generated by system 10, and/or other types of certifications), and/or otherwise organize and/or maintain information stored in electronic storage 12. As yet another example, the interface provided by information maintenance module 16 may enable one or more users associated with one or more of retailers 34 to organize and/or maintain information stored within electronic storage 12. For instance, the user may update, enter, remove, and/or otherwise interact with information related to stores associated with one of retailers 34, information related to locations at which stores of the retailer 34, information related to products sold by the retailer 34, and/or other information related to the retailer 34.

The regulation request reception module 18 may be configured to receive regulation requests. The regulation requests may request retail display regulations stored within electronic storage 12. A given regulation request may specify which retail display regulations are requested directly, or the given regulation request may specify which retail display regulations are requested indirectly by indicating display circumstances associated with a specific set of one or more retail display regulations. By way of example, the given regulation request may indicate a jurisdiction, a location, a store, a retailer, a product, a promotion (e.g., a "sale" or "price reduction"), a retail display material type, and/or other circumstances associated with a specific set of retail display regulations. As a more specific (but non-limiting) example, the given regulation request may indicate a requesting a retailer, a relevant store location, and a relevant product.

The regulation request reception module 18 may be configured to receive regulation requests that are communicated to processor(s) 14 electronically (e.g., over a communications network such as the Internet or other networks). In some instances, regulation requests may be received by regulation request reception module 18 from other ones of 16, 20, 22, 24, 26, 28, and/or 30. In such instances, these regulation requests may come as a call for information from one or more of 16, 20, 22, 24, 26, 28, and/or 30 being executed within a device that is common with regulation request reception module 18. Or, these regulation requests may be received by regulation request reception module 18 from one or more of 16, 20, 22, 24, 26, 28, and/or 30 being executed in a device that is separate from the device executing regulation request reception module 18 (e.g., via a communications network, via a dedicated connection, and/or via other electronic communications media).

The regulation request processing module 20 may be configured to process received regulation requests. Processing received regulation requests may include identifying the retail display regulations requested in a given regulation request, and obtaining the identified retail display regulations. The retail display regulations may be identified based on display circumstances indicated in the given regulation request. The requested retail display regulations may be obtained from electronic storage 12. Upon obtaining the requested retail display regulations, regulation request processing module 20 may provide access to the obtained retail display regulations to the requesting entity. If the requesting entity is a regulating entity associated with one or more jurisdictions, providing access to the obtained retail display regulations may include electronically transmitting the obtained retail display regulations to a computing platform associated with the requesting entity. If the requesting entity is one of modules 16, 18, 22, 24, 26, 28, and/or 30, providing access to the obtained retail display regulations may include enabling the requesting module to access the obtained retail display regulations within electronic storage 12, or providing the obtained retail display regulations to the requesting module.

As mentioned above, in some implementations, one of retailers 34 and/or regulating entities 32 may request access to retail display regulations by issuing a regulation request to regulation request reception module 18.

In response to such a regulation request, regulation request processing module 20 may provide access to the requested retail display regulations in a "raw" form that simply enumerates that requested retail display regulations. However, regulation request processing module 20 may alternatively, or additionally, provide access to the requested retail display regulations in the form of mock and/or generic retail display materials (or files defining the retail display materials) that conform to the requested regulations. The mock and/or generic retail display materials may be implemented by the retailer 34 and/or regulating entity 32 in certification of compliance with retail display regulations. The mock and/or generic retail display materials (or files defining the retail display materials) may include retail display materials that have previously been generated and stored within electronic storage 12 as representative of the requested retail display regulations. The mock and/or generic retail display materials (or files defining the retail display materials) may be generated dynamically by regulation request processing module 20 in response to the retail display materials request from the retailer 34 and/or regulating entity 32.

The retail display materials request module 22 may be configured to receive retail display materials requests. The retail display materials requests request generation of one or more retail display materials files that define retail display materials to be displayed in a retail environment. The retail display materials requests may specify one or more display circumstances (e.g., a retailer, one or more stores, one or more locations, one or more products, one or more promotions, a price, a retail display material type, and/or other display circumstances) in which the requested retail display materials will be displayed. For example, one or more display circumstances may be specified by one or more planogram files included in the retail display materials request. The retail display materials request module 22 may receive retail display materials requests from one or more of retailer retailers 34, one or more of regulating entities 32, and/or from other sources. Requests from retailers 34 and/or regulating entities 32 may be received by retail display materials request module 22 electronically (e.g., via a communications network such as the Internet, via a dedicated connection, and/or via other communications media).

The retail display materials definition module 24 may be configured to generate, responsive to retail display materials requests received by retail display materials request module 22, retail display materials files. The generation of retail display materials files in response to a given retail display materials request may include generating a regulation request to regulation request reception module 18 for retail display regulations corresponding to the display circumstances indicated in the given retail display materials request. In response to the generated regulation request, retail display materials definition module 24 may receive access to retail display regulations that correspond to the display circumstances indicated in the retail display materials request (e.g., from regulation request processing module 20). Based on the retail display regulations for which access is received, retail display materials definition module 24 may generate the requested retail display materials files for the display circumstances indicated in the given retail display materials request. These retail display materials files define retail display materials for the display circumstances that conform to the received retail display regulations (where appropriate).

As will be appreciated, in some implementations, each of the individual retail display materials files generated by retail display materials definition module 24 may not have to conform to all of the retail display regulations to which retail display materials definition module 24 receives access. By way of non-limiting example, a product-specific retail display regulation may be specific to a subset of products indicated in the retail display materials request. In this example the retail display materials files generated by retail display materials definition module 24 for the subset of products conform to the product-specific retail display regulation, but retail display materials files generated for products not in the subset of products may not conform to the product-specific retail display regulation. As another (also non-limiting) example, a retail display materials request from one of retailers 34 may indicate a plurality of stores located in different jurisdictions (e.g., a first jurisdiction and a second jurisdiction). In this example, retail display materials definition module 24 may receive access to retail display regulations for all of the jurisdictions indicated in the retail display materials request, but the retail display materials files generated for the individual stores may conform only to the retail display regulations for the jurisdiction(s) in which they reside.

The retail display materials generation module 26 is configured to generate retail display materials in response to a receipt of a retail display materials request by retail display materials request module 22. The generation of retail display materials may include initiation of production of retail display materials on an output device 36 (e.g., a printing device). The output device 36 may be operatively linked with retail display materials generation module 26, or production of the retail display materials on output device 36 may be initiated by retail display materials generation module 26 by transmitting instructions for generating the retail display materials to a computing platform in control of output device 36 (e.g., if output device 36 is associated with the requesting retailer 34).

In some implementations, in addition to initiating production of retail display materials on output device 36, retail display materials generation module 26 may provide one or more of the relevant retail display regulations to the regulating entity 32 or retailer 34 that issued the retail display materials request to retail display materials request module 22. The provision of the relevant retail display regulations with the initiation of production of the retail display materials may enable the requesting regulating entity 32 and/or retailer 34 to ensure that the retail display materials comply with the relevant retail display regulations, that the relevant retail display regulations are correct and/or current, may facilitate certification of compliance with retail display regulations, and/or may otherwise facilitate use of the retail display materials.

The certification module 28 is configured to manage information related to certifications related to retail display regulations. These certifications may include certifications by regulating entities 32 with respect to retail display regulations stored within electronic storage 12 as a whole, retail display materials (and/or retail display materials files defining the same) generated by system 10, and/or other certifications that are based on system 10 as a whole. The certifications may include certifications by regulating entities 32 that are specific to individual retailers 34, and/or individual stores associated with individual retailers 34.

As was described above, information maintenance module 16 may enable regulating entities 32 to access, review, enter, edit, and/or otherwise interact with retail display regulations stored to electronic storage 12. The regulation request processing module 20 may enable regulating entities 32 to access to retail display regulations stored to electronic storage 12. Based on access to the retail display regulations achieved by regulating entities 32 via information maintenance module 16 and/or retail display regulation request processing module 20, regulating entities 32 may certify retail display regulations within electronic storage 12 and/or retail display materials generated by system 10 on the basis of the stored retail display regulations.

These certifications may provide the retailers 34 with a degree of confidence in the retail display materials defined and/or generated by system 10. In some implementations, the certifications may enable retailers 34 to forego their own certification with one or more of regulating entities 32. The certifications may be stored by electronic storage 12, and may be provided to retailers 34 upon request. For example, the certifications may be provided to retailers 34 along with retail display materials (and/or retail display materials files defining the same).

In some implementations, a given one of regulating entities 32 may require retailers 34 to individually certify their retail display materials and/or generic formats for the same. In such implementations, retailers 34 and/or the given regulating entity 32 may update certifications within electronic storage 12 based on the results of the individual certifications of the retail display materials and/or formats. These updated certifications may then be used to determine the accuracy of the retail display regulations stored in electronic storage 12 for the given regulating entity 32 and/or for other purposes.

The reminder module 30 may be configured to issue reminders to retailers 34 and/or regulating entities 32 related to retail display materialsing. These reminders may include, for example, certification reminders, promotional reminders, and/or other reminders.

Certifications by one or more of regulating entities 32 may expire. For example, a certification for system 10 generally, or for one of retailers 34 individually (or for individual stores associated with retailer 34) may expire on a specific day, or after a predetermined time period. The reminder module 30 may be configured to generate reminders of the expiration to one or more of an administrator of system 10, the retailer 34, and/or the certifying regulating entity 32. These reminders may prompt the administrator of system 10, the retailer 34, and/or the certifying regulating entity 32 to take action (e.g., re-certification) that will result in the certification not simply expiring.

One or more of regulating entities 32 may have retail display regulations that specify one or more time periods associated with promotional labeling and sales. By way of example, a period of time that an item may be labeled as "on sale" or having a "reduced price" may be regulated, a period of time between "sales" or "price reductions" may be regulated, and/or other periods of time may be regulated. To facilitate compliance with such regulations, reminder module 30 may generate reminders to retailers 34 that have (or have had) promotions on items appraising them of their compliance with the appropriate regulations. These reminders may be transmitted electronically to a computer platform associated with the retailers (e.g., e-mail, text message, voice mail, electronic calendar invitation, and/or other electronic reminders). The reminder module 30 may determine that a given retailer 34 has a promotion regulated by one or more retail display regulations based on retail display materials requests and/or regulation requests made to system 10 by the given retailer 34.

Figure 3:
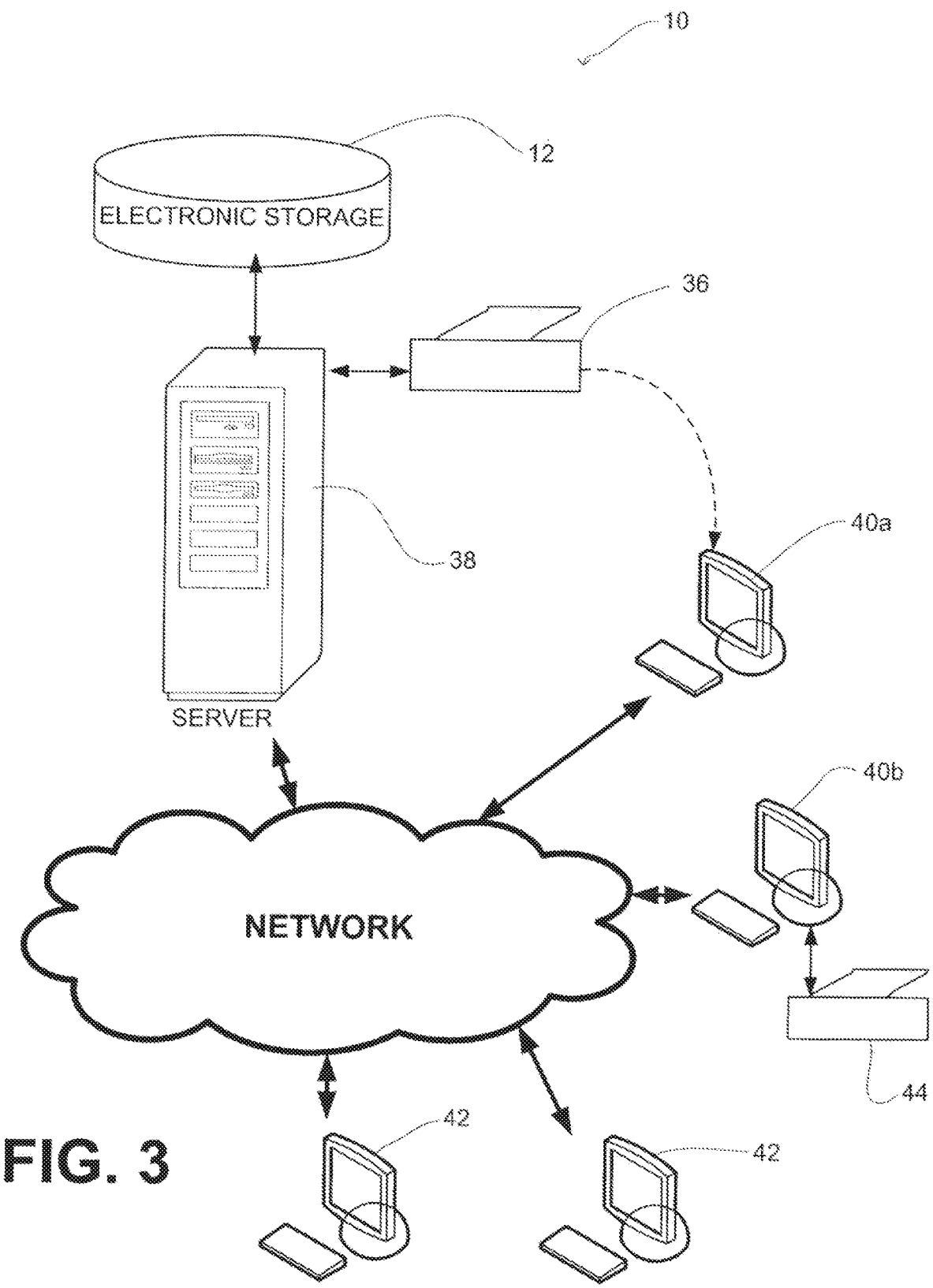
FIG. 3 illustrates a system configured to manage compliance with one or more retail display regulations within a plurality of jurisdictions, according to one or more embodiments of the invention.

FIG. 3 illustrates an exemplary configuration of system 10, in accordance with some implementations. In the configuration illustrated in FIG. 3, system 10 includes a server 38 and electronic storage 12. The server 38 may include a web server, an application server, and/or other server functionality. The server 38 may operate in a client/server relationship with a first set of client computing platforms 40 (illustrated in FIG. 3 as client computing platform 40a and client computing platform 40b) and a second set of client computing platforms 42. The client computing platforms 40 and/or 42 may be in operative communication with server 38 via a network, such at the Internet and/or other networks.

The client computing platforms 40 may be associated with individual retailers (e.g., retailers 34 shown in FIG. 1 and described above). In some instances, one or more of client computing platforms 40 may be associated with a single store location (or set of store locations) of a retailer. In some instances, one or more of client computing platforms 40 may be associated with a retailer as a whole. The client computing platforms 42 may be associated with individual regulating entities charged with regulating retail display materials (e.g., regulating entities 32 shown in FIG. 1 and described above).

The server 38 may include one or more processors that are similar to or the same as processor(s) 14 (shown in FIG. 1 and described above). As such, the retailers and/or regulating entities may access and/or interact with information related to retail display materials stored in electronic storage 12 via the client computing platforms 40 and 42 in the manner described above with respect to FIG. 1.

A retailer associated with client computing platform 40a may generate for transmission to server 38 a regulation request and/or a retail display materials request. In response to a regulation request, server 38 may provide access to the requested retail display regulations on client computing platform 40a. This may include transmitting the requested retail display regulations (and/or retail display materials files defining mock or generic price files) to client computing platform 40a. The retailer associated with client computing platform 40a may implement the received information to ensure that the retail display regulations are current, to seek certification with one or more regulating entities, and/or for other purposes.

In response to a retail display materials request from client computing platform 40a, server 38 may initiate generation of retail display materials corresponding to the retail display materials request on output device 36, which is in operative communication with server 38. The retail display materials generated by output device 36 may then be provided to the retailer associated with client computing platform 40a. This may include providing the retail display materials to a distribution location for the retailer so that the retailer can distribute the retail display materials to the appropriate stores, providing the retail display materials individual stores associated with the retailer, or some combination of these. The provision of the retail display materials to the appropriate destination may be automated based on the received retail display materials request.

As can be seen in FIG. 3, the retailer associated with client computing platform 40b may have its own one or more output devices 44 configured to generate retail display materials based on retail display materials files. The one or more output devices 44 may include output devices 44 located at distribution locations, from which retail display materials are distributed by the retailer to individual stores. The one or more output devices 44 may include output devices 44 located at individual stores capable of producing retail display materials for the individual stores. In response to a retail display materials request from client computing platform 40b, server 38 may generate retail display materials files that define retail display materials corresponding to the retail display materials request to client computing platform 40b. The generated retail display materials files may then be electronically transmitted to client computing platform 40b for implementation by the retailer to produce the requested retail display materials on output devices 44.

The client computing platforms 42 are configured to access information stored in electronic storage 12 via server 38 to review retail display regulations stored within electronic storage 12, review certifications, update certifications, and/or otherwise access and/or interact with the information stored within electronic storage 12. By way of example, client computing platforms 42 may transmit regulation requests to server 38. In response to the regulations requests, server 38 may provide access to the requested regulations (and/or mock or generic retail display materials associated with the requested regulations). The client computing platforms 42 may interact with the information stored in electronic storage 12 to update, enter, and/or remove regulations, as was discussed above with respect to information maintenance module 16 (shown in FIG. 1 and described above).

It will be appreciated that the configuration of system 10 illustrated in FIG. 3 is not intended to be limiting, and that other configurations are contemplated. For example, in some implementations, one or more of modules 16, 18, 20, 22, 24, 26, 28, and/or 30 illustrated in FIG. 1 are provided (in whole or in part) within client computing platforms 40 and/or client computing platforms 42, rather than entirely within server 38. As another example, electronic storage 12 may include storage locally at computing platforms associated with retailers (e.g., client computing platforms 40). The local storage may hold retail display regulations relevant to the individual retailers, and the computing platforms may access the retail display regulations stored locally to generate retail display materials, rather than requesting information stored remotely with server 38. Other configurations are also contemplated.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to produce a tangible retail display material subject to government regulation, the system comprising:
electronic storage configured to store a retail display government regulation for a tangible retail display material that is to be displayed in a retail environment; and
one or more processors in operative communication with the electronic storage, the one or more processors being configured to:
receive a retail display material request for production of the tangible retail display material to be displayed within a legal jurisdiction subject to a retail display government regulation;
obtain from the electronic storage the retail display government regulation associated with the tangible retail display material and the legal jurisdiction; and
produce the tangible retail display material according to the obtained retail display government regulation, wherein the retail display government regulation regulates a display parameter of the tangible retail display material, and the display parameter corresponds to at least one of a group consisting of: a shelf level requirement; a retail display material background color restriction; a retail display material space allowance; a product description requirement; a retail price listing requirement; a unit price listing requirement; a unit measurement requirement; a UPC/GTIN/SKU requirement; a sale and/or reduced price requirement; and combinations thereof.

2. The system of claim 1, wherein the regulation request is transmitted electronically to the one or more processors over a communications network from a computing platform associated with a retailer, and wherein access to the requested retail display government regulation is provided by transmitting the requested retail display regulation to the computing platform associated with the retailer over the communications network.

3. The system of claim 1, wherein the retail display government regulation regulates one or both of price labels and/or point of display signage.

4. The system of claim 1, wherein the tangible retail display material defines a price label for an individual product to be affixed to a retail display apparatus separate from the individual product such that the price label conforms to the obtained retail display government regulation.

5. The system of claim 4, wherein producing the tangible retail display material comprises printing the price label.

6. The system of claim 1, wherein the tangible retail display material defines a shelf strip to be affixed to a retail display apparatus, the shelf strip indicating positions at which a plurality of products should be stocked on the retail display apparatus, the shelf strip including information about the plurality of products that are regulated by the obtained retail display government regulation.

7. The system of claim 6, wherein producing the tangible retail display material comprises printing the shelf strip.

8. The system of claim 1, wherein the tangible retail display material defines a shelf strip to be affixed to a retail display apparatus, the shelf strip indicating a plurality of positions at which an individual product should be stocked on the retail display apparatus, the shelf strip including
information about the individual product that is regulated by the obtained retail display government regulation.

9. The system of claim 8, wherein producing the tangible retail display material comprises printing the shelf strip.

10. The system of claim 1, wherein the electronic storage is further configured to store certification information related to certification of the retail display government regulation within the legal jurisdiction.

11. The system of claim 10, wherein the one or more processors are further configured to manage the certification information.

12. A computer-implemented method of managing compliance with a retail display government regulation for a tangible retail display material that is to be displayed in a retail environment, wherein the method is implemented in a computer system comprising one or more processors configured to perform:

storing, to electronic storage accessible to the one or more processors, a retail display government regulation for a tangible retail display material to be display in a retail environment, receiving, by the one or more processors of the computer system, a retail display material request for production of the tangible retail display material to be displayed in the retail environment, wherein the retail display material request specifies a legal jurisdiction within which the tangible retail display material will be displayed;

obtaining, by the one or more processors from the electronic storage, the retail display government regulation associated with the tangible retail display material and the legal jurisdiction, producing, by the one or more processors, the tangible retail display material according to the obtained retail display government regulation, wherein the retail display government regulation regulates a display parameter of the tangible retail display material, and the display parameter corresponds to at least one of a group consisting of: a shelf level requirement; a retail display material background color restriction; a retail display material space allowance; a product description requirement; a retail price listing requirement; a unit price listing requirement; a unit measurement requirement; a UPC/GTIN/SKU requirement; a sale and/or reduced price requirement; and combinations thereof.

13. The method of claim 12, wherein the retail display government regulation is transmitted electronically to the one or more processors over a communications network from a computing platform associated with a retailer, and wherein access to the retail display government regulation is provided by transmitting the retail display government regulation to the computing platform associated with the retailer over the communications network.

14. The method of claim 12, wherein the retail display government regulation regulates one or both of price labels and/or point of display signage.

15. The method of claim 12, wherein the retail display material defines a price label for an individual product to be affixed to a retail display apparatus separate from the individual product such that the price label conforms to the obtained retail display government regulation.

16. The method of claim 15, wherein producing the tangible retail display material comprises printing the price label.

17. The method of claim 12, wherein the tangible retail display material defines shelf strip to be affixed to a retail display apparatus, the shelf strip indicating positions at which a plurality of products should be stocked on the retail display apparatus, the shelf strip including information about the plurality of products that are regulated by the obtained retail display government regulation.

18. The method of claim 17, wherein producing the tangible retail display material comprises printing the shelf strip.

19. The method of claim 12, wherein the tangible retail display material defines a shelf strip to be affixed to a retail display apparatus, the shelf strip indicating a plurality of positions at which an individual product should be stocked on the retail display apparatus, the shelf strip including information about the individual product that is regulated by the obtained retail display government regulation.

20. The method of claim 19, wherein producing the tangible retail display material comprises printing the shelf strip.

21. The method of claim 12, wherein the electronic storage is further configured to store certification information related to certification of the retail display government regulation within the legal jurisdiction.

22. The method of claim 21, the method further comprising managing, by the one or more processors, the certification information.

* * * * *